July 26, 1966  J. E. BODMER  3,262,757

WAVE ENGINE

Filed March 6, 1964

INVENTOR.
JAKOB E. BODMER
BY George L. Church
ATTORNEY

United States Patent Office 3,262,757
Patented July 26, 1966

3,262,757
WAVE ENGINE
Jakob E. Bodmer, Media, Pa., assignor to Sun Oil Company, Philadelphia, Pa., a corporation of New Jersey
Filed Mar. 6, 1964, Ser. No. 349,884
10 Claims. (Cl. 23—284)

This invention relates to a wave engine for carrying out chemical reactions of the endothermic type. Such reactions may be carried out by subjecting the reactants to one or more mechanical shock waves, thereby to produce a high temperature in such reactants for a very short period of time.

In various chemical reactions, it is necessary that very high temperatures be employed, and also that the residence time of the reactants at the elevated temperature be very short. An example of a reaction in this category is the production of acetylene and hydrogen cyanide by the reaction of methane and nitrogen, as exemplified by the following chemical equations:

$$2CH_4 \rightarrow C_2H_2 + 3H_2$$

and $$2CH_4 + N_2 \rightarrow 2HCN + 3H_2$$

For the above equations, which may in effect be thought of as a single reaction, to proceed, it is necessary that very rapid heating of the reactants from a temperature not greater than 900° F. to a temperature of not less than 3200° F., be accomplished. The maintenance of the reactants too long at temperatures in the range of 900° to 3200° F. results in excessive reaction, producing undesired products such as carbon.

It is necessary that the heating through the previously-mentioned crucial range be extremely rapid. It is also necessary that upon reaching the reaction temperature, which is for example in the range of 3200° to 4000° F., the reactants be maintained at the reaction temperature for only a short time. It is further necessary that the reaction products be rapidly cooled from the reaction temperature to a temperature not substantially greater than 1600° F.

The present invention provides a wave engine of novel structure, which is capable of producing rapid heating and cooling and which is therefore highly satisfactory for use in carrying out various chemical reactions which require rapid heating and cooling. The wave engine of this invention has superior efficiency and attains the necessary high temperatures, while avoiding operating problems which have beset prior art wave engines.

The objects of this invention are accomplished, briefly, in the following manner: A disc-like rotor is mounted for rotation about an axis, e.g. a horizontal axis, this rotor having therein a straight channel (shock tube) which extends transversely to the axis and along a diameter of the disc. A stationary port ring surrounds the disc, this port ring having inlets and outlets therein which come into communication with the channel as the latter is rotated; these inlets and outlets serve to feed gases to and from the shock tube.

A detailed description of the invention follows, taken in conjunction with the accompanying drawings, wherein.

It has been found that it is possible to convert natural gas (methane) into acetylene, or mixtures of natural gas and nitrogen into hydrogen cyanide and acetylene, by heating the reagents quickly to temperatures above 3200° F., the heating to be almost immediately followed by cooling to a temperature not substantially greater than 1600° F., the cooling rate being comparable to the heating rate. More specifically, a mixture of nitrogen and methane can be converted to a mixture consisting of acetylene, hydrogen cyanide, hydrogen, nitrogen, and methane, at a low power plus heat cost and with good yields of acetylene, hydrogen cyanide, and by-product hydrogen. The reactions are essentially of the type expressed in the chemical equations set forth hereinabove.

The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. That is to say, the process involves adiabatic compression of the process gas by another gas, the driving gas, which latter works in a way similar to a mechanical piston. The adiabatic compression is the result of a shock wave produced in the tube.

The heating is followed almost immediately by rapid cooling through expansion. If there is a sequence of equivalent independent shock tube processes, the result is essentially a continuous flow process.

The gas or mixture of gases which is acted upon in the shock tube may be termed the reagents, or a process gas, or a reactant mixture, or a charge gas, or a reactant material, or a process mixture.

Figure 1:
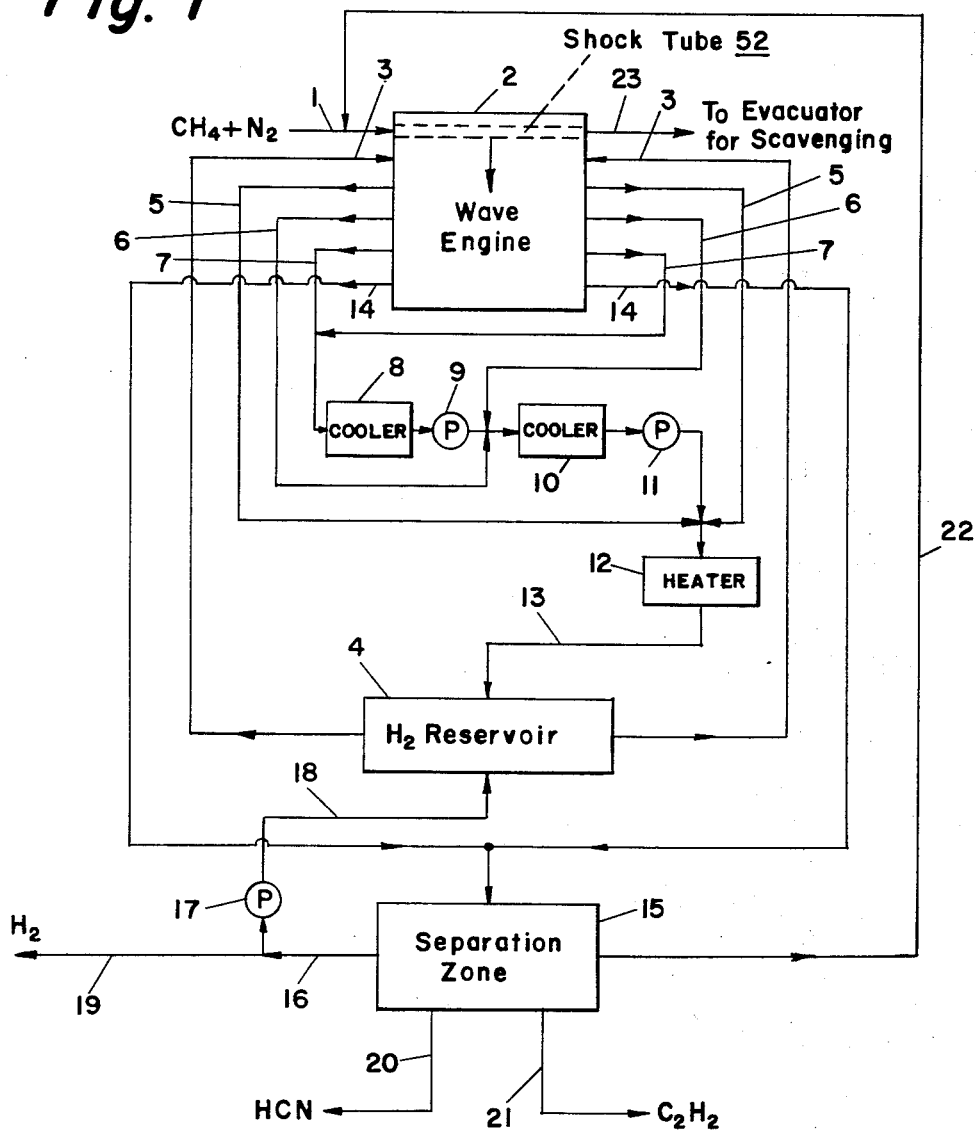
FIG. 1 is a schematic flow diagram of a wave engine system set up for the preparation of hydrogen cyanide and acetylene from methane and nitrogen.

Referring now to FIG. 1, a mixture of nitrogen and methane (natural gas), at essentially atmospheric pressure and a temperature of about 890° F., is introduced through the conduit 1 (which, although not illustrated in FIG. 1, may be a manifolded conduit) into the reaction tube (shock tube) 52 of a wave engine 2, which is of generally circular configuration. This introduction of reactant material begins a cycle of operation of the wave engine. As subsequently more fully described, one side of the wave engine receives reactant material, one side of the wave engine is coupled to an evacuator to effect a scavenging process, diametrically-opposite sides receive driving gas, from diametrically-opposite sides driving gas is withdrawn, and from diametrically-opposite sides reaction products are withdrawn. The same numerals are employed at diametrically-opposite sides to designate conduits which correspond in function. In FIG. 1, opposite sides of the square block 2 represent "opposite sides" of the generally circular wave engine, and conduits or lines which are diametrically-opposite are drawn in approximately the same horizontal plane.

The introduction of reactant material (by means of conduit 1) into one side of the wave engine (which is equivalent to saying into one end of the reaction tube or shock tube, as will later become apparent) causes a scavenging of the tube to take place simultaneously, by way of a conduit 23 which is coupled to the diametrically-opposite side of the wave engine and to a suitable evacuator. Conduit 23, like conduit 1, may be a manifolded conduit, and is coupled to wave engine 2 at a location which is diametrically opposite to the coupling location of conduit 1 to the engine. In FIG. 1, the shock tube 52 is schematically illustrated in alignment with conduits 23 and 1; this tube is schematically indicated as moving downwardly from this position, toward lines 3, 5, 6, 7, and 14 in succession.

After shock tube 52 leaves conduits 1 and 23, comes into alignment with lines 3, a driving gas, for example hydrogen at about twenty-two atmospheres absolute and 1040° F., is suddenly introduced through the lines 3 from a hydrogen reservoir 4 into diametrically-opposite sides of the wave engine 2. Shock waves are thereby created in the reaction tube of the wave engine. The methane and nitrogen (assumed to be at this time in the reaction tube) are adiabatically compressed, with a resulting rapid increase in temperature (to a temperature above 3200° F.). At this rather high reaction temperature, the methane and nitrogen react to form hydrogen cyanide and acetylene, with hydrogen as a by-product, as indicated by the chemical reactions set out previously.

After the adiabatic compression process is complete, a portion of the driving gas is removed from diametrically-opposite sides of the wave engine through the lines 5, at about twenty-two atmospheres and 1040° F. Subsequently, a second portion of the driving gas is withdrawn from diametrically-opposite sides of the wave engine through the lines 6, at about seven atmospheres and 645° F. Subsequently, the remainder of the driving gas is withdrawn from diametrically-opposite sides of the wave engine through the lines 7, at about two atmospheres and 330° F.

The last-mentioned portion of the driving gas is cooled by passing it through a cooler 8, the two lines 7 being for example manifolded together to the inlet side of this cooler, to reduce the temperature to about 140° F. This portion of the driving gas is then compressed to about seven atmospheres by passage through a compressor 9. The resulting driving gas is admixed with the driving gas removed through the lines 6, which latter are manifolded together and to the outlet side of compressor 9; the mixture is cooled in a cooler 10 to a temperature of about 140° F. The cooled gas is compressed in a compressor 11 to about twenty-two atmospheres, and is admixed with the driving gas removed through the lines 5, which latter are manifolded together and to the outlet side of compressor 11. The mixture is introduced into a heater 12, wherein it is heated to about 1040° F. The heated driving gas at about twenty-two atmospheres is supplied through a line 13 to the reservoir 4.

Following the removal of the driving gas from the respective opposite sides of the wave engine, the reaction products, together with unreacted methane and nitrogen, are withdrawn from diametrically-opposite sides of the wave engine 2 through the lines 14, as gas, at about 1540° F. and 0.5 atmosphere. The lines 14 are manifolded together and to the inlet of a separation zone 15. The material withdrawn via lines 14 is thus introduced into the separation zone 15 wherein a plurality of operations are carried out to obtain the respective constituents in purified form. Hydrogen, which was formed in the aforementioned chemical reactions, is separated by known means, such as diffusion through a palladium tube, and is removed through line 16. A portion of the removed hydrogen can be compressed in the compressor 17 to about twenty-two atmospheres and introduced through the line 18 into the reservoir 4, for subsequent use in another cycle of the wave engine operation. The remainder of the product hydrogen is withdrawn via line 19 as a product of the process.

Hydrogen cyanide is separated from the remaining product gases by scrubbing with an alkaline medium, or by other known separation procedures. This gas is withdrawn via line 20 as another product of the process. After separation of the hydrogen cyanide, acetylene is separated from the remaining gases by absorption in a copper-salt solution, or by other known means for separating acetylene from gaseous mixtures. Acetylene is withdrawn via line 21 as another product of the process. The remaining (unreacted) methane and nitrogen are recycled to the wave engine 2 through line 22, which couples into conduit 1.

A summary of the operation of the wave engine of this invention will now be given. Assume that a straight horizontally-extending open-ended tube 52 is moving (at a very rapid rate) downwardly as a unit, in the plane of the paper in FIG. 1 and in the direction of the arrow, for each cycle of operation. This tube 52 would by way of example have a length substantially equal to the width of block 2, and would thus move past the ends of the various lines and conduits shown schematically in FIG. 1, starting at the top of the block 2 (as illustrated in FIG. 1) for each cycle of operation. In actual practice, as will be described hereinafter, this straight tube is mounted in a disc which rotates (at high angular velocity) within a port ring so that the tube ends rotate past the ends of the lines and conduits which are coupled to ports in the ring.

As one end of the tube passes the end of line or conduit 1, fresh charge gas is admitted to the tube. At this time, as illustrated in FIG. 1, the other end of the tube is passing conduit 23, which leads to an evacuator; this causes the new charge gas to push out of the tube the gases left over from the previous cycle of operation, by a scavenging process. This scavenging takes place at essentially atmospheric pressure.

When the opposite ends of the tube thereafter come into alignment with the ends of lines 3, both ends of the tube are thereby suddenly connected to the reservoir 4, which contains the high pressure driving gas, hydrogen. The hydrogen enters the tube with high velocity from both ends, creating two shock waves which push the process gas (already in the tube) toward the middle. This adiabatic compression compresses the process gas and brings it very rapidly to the reaction temperature, not less than 3200° F. The two shock waves, emanating from the tube ends, eventually meet in the middle and are reflected. When each of the two compression waves (which have entered respective ends of the tube as shock waves) has arrived at its respective tube end as a reflected wave, the compression process is complete. It should be noted here that when the two compression waves meet at the center (or middle) of the tube, a momentary peak pressure of about 40.4 atmospheres is reached; the pressure in the reflected wave is about 20.5 atmospheres.

After completion of the compression process, the tube contains a charge of process (now product) gas and hydrogen at high pressure, with both tube ends being closed (since, by this time, the ends of the tube have completed their travel past the ends of lines 3).

Following the compression process, both ends of the tube come into alignment with the ends of lines 5; this means that both such ends simultaneously become open to spaces of a pressure below the pressure in the tube. Now, hydrogen begins to flow out of the tube, setting up expansion waves which emanate from the respective ends of the tube. The expansion described begins to rapidly reduce the temperature and pressure of the product gas. The two expansion waves, emanating from the two tube ends, eventually meet in the middle and are reflected. When each of the two expansion waves has arrived at its respective tube end as a reflected wave, the first expansion process is complete.

For a more detailed description of the compression and expansion processes previously referred to, reference may be had to the copending application, Serial No. 326,009, filed November 26, 1963 and now Patent No. 3,254,960, issued June 7, 1966.

After completion of the first expansion process, the tube contains the original quantity of product gas, plus a fraction of the hydrogen which originally entered the tube; these contents are at a reduced pressure. At this point, both tube ends are closed, the ends of the tube having completed their travel past the ends of lines 5.

The expansion process described is repeated two more times, the tube ends being opened each time to spaces of progressively lower pressure (to wit, first the ends of lines 6 and then the ends of lines 7). Thus, a total of three expansion stages are employed. At the end of the third expansion stage, all the motive or driving hydrogen has left the tube.

After the third expansion stage, there is an expansion and discharge stage, during which the converted gaseous mixture is discharged; this expansion and discharge occurs during the time that both ends of the tube are in communication with the ends of lines 14.

This completes one cycle of opeartion of the wave engine, and shortly thereafter a new cycle begins when one end of the tube again rotates past the end of conduit 1, and at the same time the other tube end rotates past the end of conduit 23.

The admission of new reactant material (via conduit 1) into one end of the tube pushes out (via conduit 23, coupled to the other end of the tube) the materials remaining therein after a previous cycle of operation, thus providing a scavenging process.

A detailed description of the construction of wave engine 2 will now be given, with reference to FIGS. 2–4. A stationary port ring 24 is mounted in a position wherein its longitudinal axis extends substantially horizontally, and its two parallel annular faces (to wit, its front and rear faces 25 and 26, respectively, see FIG. 3) lie in parallel vertical planes. By way of example, port ring 24 may have a thickness in the axial direction of one inch, an I.D. of twelve inches, and an O.D. of 14½ inches. Ring 24 has therein a pair of diametrically-opposite, radially-extending apertures 27 which are centered on the respective opposite ends of its central horizontal diameter. Apertures 27 are approximately rectangular in outline, but have arcuate upper and lower boundaries (see FIG. 4). The longer dimension (e.g., this may be 1⅜ inches) of these approximately rectangular apertures 27 extends vertically in the plane of the paper in FIGS. 2 and 4, while the shorter dimension (e.g., this may be about 9/16 inch) extends horizontally in the plane of the paper in FIG. 4. Apertures 27 are the apertures for the driving gas (hydrogen) supply nozzles.

In each of the apertures 27, there is mounted a respective nozzle 28. These nozzles have at their inner ends a rectangular cross-section with inside dimensions about ¼ inch by one inch, they open into the interior of the port ring 24, and they are cut off at their inner ends on a twelve-inch diameter arc, to match the curvature of the I.D. of ring 24. Toward their outer ends, each of the nozzles 28 is provided with a respective mechanical assembly which enables the nozzles to be adjusted radially with respect to the port ring, in their respective apertures 27, over a small range (e.g., .01 inch). Such assemblies are not shown completely herein, since they form no part of the present invention; they are disclosed and claimed in the co-pending application, Serial No. 334,523, filed December 30, 1963. Such assemblies may each include an externally-threaded flange 29 secured as by welding at 30 to the outer face of ring 24, and a housing 31 having female threads at one end thereof which mate with the male threads of flange 29.

The outer ends of nozzles 28 are coupled to respective ones of the lines 3 (see FIG. 1), which in turn extend to the hydrogen (driving gas) reservoir 4. Thus, by means of the nozzles 28, the driving gas is fed to diametrically-opposite areas of the interior of ring 24, that is, to diametrically-opposite sides of the wave engine.

Figure 2:
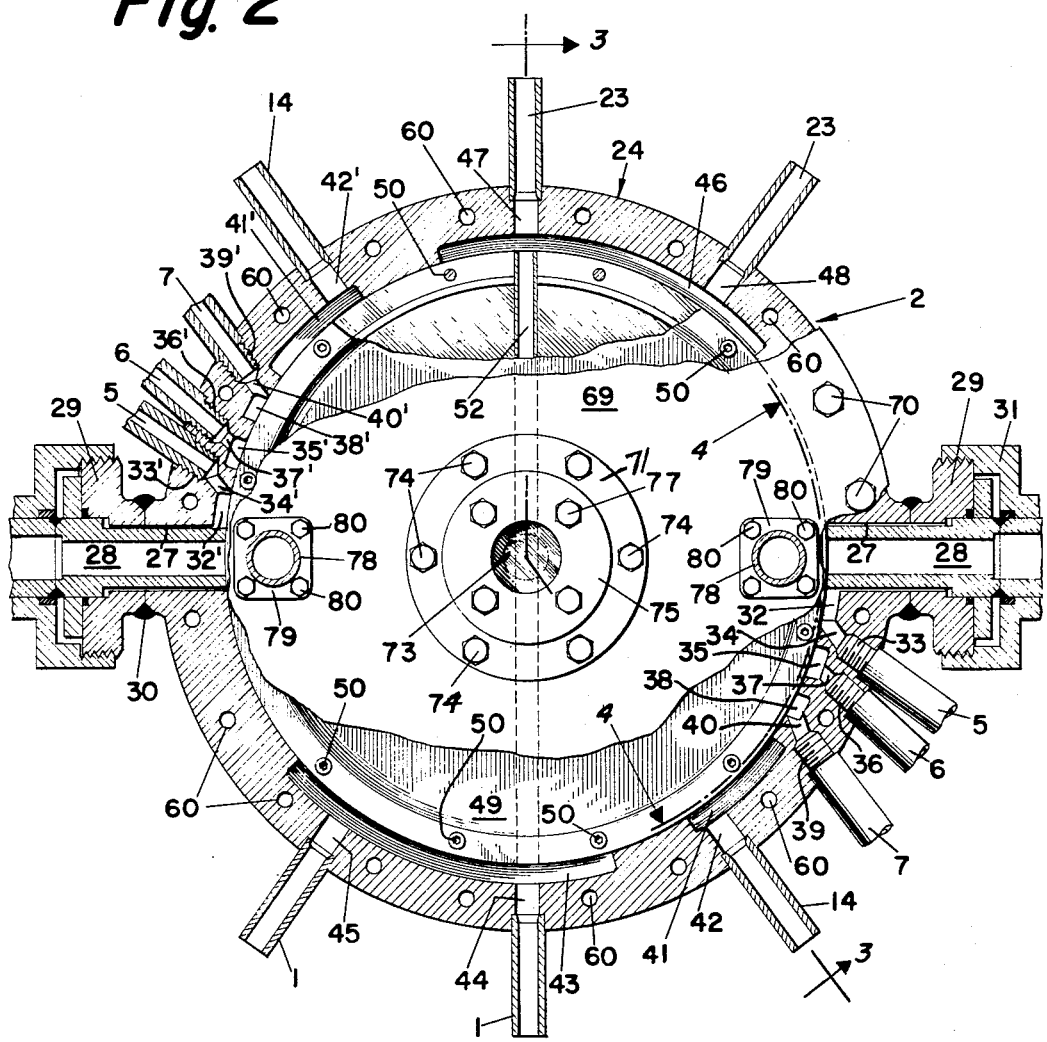
FIG. 2 is a front elevation of the wave engine of this invention, certain parts being peeled away to show the interior thereof.
Figure 4:
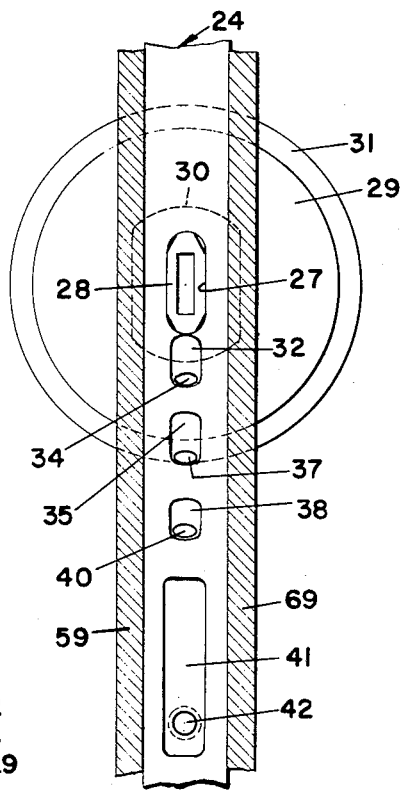
FIG. 4 is a face view, looking at the inner surface of the port ring, in the direction of arrows 4—4 in FIG. 2.

Immediately adjacent the right-hand one of the apertures 27, in the clockwise direction (when looking at the wave engine from the front thereof, as in FIG. 2), a pocket or recess 32 is cut into the inner cylindrical surface of ring 24, this pocket, like apertures 27, being centered along the axial dimension of ring 24 (see FIG. 4). From the outer face of ring 24, closely adjacent the location of recess 32, a tapped hole 33 extends into ring 24 to a certain depth, and from the bottom of hole 33 a hole 34 extends into communication with recess 32. Thus, the combination of items 32, 34, and 33 provides a port which extends entirely through ring 24, in an approximately radial direction, from the interior to the exterior thereof. One of the lines 5 has a threaded fitting on its inner end which screws into tapped hole 33; the opposite end of this line 5 is coupled into the line leading into the heater 12, as previously described in connection with FIG. 1. This line 5 thus serves as a first-stage coupling for removing driving gas from the interior of ring 24, at one side of the wave engine (to wit, the right-hand side in FIG. 2).

Diametrically opposite to pocket or recess 32, a similar pocket 32' is cut into the inner surface of ring 24, this latter pocket communicating by way of a hole 34' with the inner end of tapped hole 33' into which screws a threaded fitting provided on the inner end of the other line 5. The combination of items 32', 34', and 33' provides a port which extends entirely through ring 24, in an approximately radial direction, diametrically opposite to the port provided by 32, 34, and 33. The remote end of this other line 5 is coupled into the intake line of the heater 12, as previously described. This other line 5 thus serves as a first-stage coupling for removing driving gas from the interior of ring 24, at the other side of the wave engine (to wit, the left-hand side in FIG. 2).

Slightly clockwise (when viewed in FIG. 2) from pocket 32, a pocket or recess 35 is cut into the inner cylindrical surface of ring 24, this pocket also being centered along the axial dimension of ring 24, and, like pocket 32, being substantially rectangular in outline. From the outer face of ring 24, closely adjacent the location of recess 35, a tapped hole 36 extends into ring 24 to a certain depth, and from the bottom of hole 36 a hole 37 extends into communication with recess 35. The combination of items 35, 37, and 36 provides a port which extends entirely through ring 24, in an approximately radial direction, from the interior to the exterior thereof. One of the lines 6 has a threaded fitting on its inner end which screws into tapped hole 36; the opposite end of this line 6 is coupled into the line leading into the cooler 10, as previously described in connection with FIG. 1. This line 6 thus serves as a second-stage coupling for removing driving gas from the interior of ring 24, at one side of the wave engine (to wit, the right-hand side in FIG. 2).

Diametrically opposite to pocket or recess 35, a similar pocket 35' is cut into the inner surface of ring 24, this latter pocket communicating by way of a hole 37' with the inner end of a tapped hole 36' into which screws a threaded fitting provided on the inner end of the other line 6. The combination of items 35', 37', and 36' provides a port which extends entirely through ring 24, in an approximately radial direction, diametrically opposite to the port provided by 35, 37, and 36. The remote end of this other line 6 is coupled into the intake line of the cooler 10, as previously described. This other line 6 thus serves as a second-stage coupling for removing driving gas from the interior of ring 24, at the other side of the wave engine (to wit, the left-hand side in FIG. 2).

Slightly clockwise (viewed in FIG. 2) from pocket 35, a pocket or recess 38 is cut into the inner cylindrical surface of ring 24, this pocket also being centered along the axial dimension of ring 24, and being substantially rectangular in outline. From the outer face of ring 24, closely adjacent the location of recess 38, a tapped hole 39 extends into ring 24 to a certain depth, and from the bottom of hole 39 a hole 40 extends into communication with recess 38. The combination of items 38, 40, and 39 provides a port which extends entirely through ring 24, in an approximately radial direction, from the interior to the exterior thereof. One of the lines 7 has a threaded fitting on its inner end which screws into tapped hole 39; the opposite end of the line 7 is coupled to the intake of the cooler 8, as previously described in connection with FIG. 1. This line 7 thus serves as a third-stage coupling for removing driving gas from the interior of ring 24, at one side of the wave engine (to wit, the right-hand side in FIG. 2).

Diametrically opposite to pocket or recess 38, a similar pocket 38' is cut into the inner surface of ring 24, this latter pocket communicating by way of a hole 40' with the inner end of a tapped hole 39′ into which screws a threaded fitting provided on the inner end of the other line 7. The combination of items 38′, 40′, and 39′ provides a port which extends entirely through ring 24, in an approximately radial direction, diametrically opposite to the port provided by 38, 40, and 39. The remote end of this other line 7 is coupled to the intake of the cooler 8, as previously described. This other line 7 thus serves as a third-stage coupling for removing driving gas from the interior of ring 24, at the other side of the wave engine (to wit, the left-hand side in FIG. 2).

The port ring 24 is provided with two diametrically-opposite "product out" portions or ports to which the inner ends of the respective lines 14 are coupled; it will be recalled that the other (or outer) ends of these lines are coupled to the inlet of the separation zone 15. Beginning at a point slightly clockwise (when viewed in FIG. 2) from pocket 38, an arcuately-elongated groove 41 is cut into the inner cylindrical surface of ring 24, this groove being centered along the axial dimension of ring 24 and being substantially rectangular in outline (see FIG. 4). Groove 41 has a certain angular length extending from the aforesaid point, and near the clockwise end of this groove, a hole 42 extends in a radial direction through port ring 24, into communication with groove 41. The outer end of hole 42 is threaded, and a threaded fitting provided on the inner end of one of the lines 14 screws into this hole. This one line 14 extends to the inlet of separation zone 15 (FIG. 1), as previously described.

Beginning at a point slightly clockwise (when viewed in FIG. 2) from pocket 38′, and diametrically opposite to groove 41, an arcuately-elongated groove 41′ is cut into the inner cylindrical surface of ring 24, this groove being centered along the axial dimension of ring 24 and being similar in shape to groove 41. Groove 41′ has a certain angular length extending from the aforesaid point, and near the clockwise end of this groove, a hole 42′ extends in a radial direction through port ring 24, into communication with groove 41′. Hole 42′ is diametrically opposite hole 42, and grooves 41 and 41′ have the same angular length. The outer end of hole 42′ is threaded, and a threaded fitting provided on the inner end of the other one of the lines 14 screws into this hole. This other line 14 also extends to the inlet of separation zone 15, as previously described.

The intake (or reactant feed, or charge) portion of the port ring 24 (to which the reactant material feed conduit 1, FIG. 1, is coupled) may be considered as beginning at a point somewhat clockwise (viewed in FIG. 2) from the clockwise end of groove 41 and extending in a clockwise direction around to a point spaced considerably in the counterclockwise direction from the left-hand nozzle aperture 27. An arcuately-elongated groove 43, extending between the two points just mentioned, is cut into the inner cylindrical surface of ring 24, this groove being centered along the axial dimension of ring 24 and being substantially rectangular in outline. Two radially-extending holes 44 and 45 are drilled through port ring 24 into communication with groove 43, at angularly-spaced locations along this groove. Hole 44, for example, may extend along the vertical diameter of the port ring. The outer ends of holes 44 and 45 are threaded, and threaded fittings provided on the inner ends of the two respective conduits 1 screw into these holes. The outer ends of the two feed conduits 1 are manifolded together and to a source of supply of the gaseous reactant material, or charge material (e.g., a mixture of nitrogen and methane).

The scavenging or purging portion of the port ring 24 (to which the scavenging conduit 23, FIG. 1, is coupled) may be considered as beginning at a point somewhat clockwise (viewed in FIG. 2) from the clockwise end of groove 41′ and extending in a clockwise direction around to a point spaced considerably in the counterclockwise direction from the right-hand nozzle aperture 27. An arcuately-elongated groove 46, extending between the two points just mentioned, is cut into the inner cylindrical surface of ring 24, this groove being centered along the axial dimension of ring 24 and being substantially rectangular in outline. Two radially-extending holes 47 and 48 are drilled through port ring 24 into communication with groove 46, at angularly-spaced locations along this groove. Hole 47, for example, may extend along the vertical diameter of the port ring. Groove 46 is diametrically opposite groove 43, hole 47 is diametrically opposite hole 44, and hole 48 is diametrically opposite hole 45. Grooves 46 and 43 have the same angular length. The outer ends of holes 47 and 48 are threaded, and threaded fittings provided on the inner ends of the two respective conduits 23 screw into these holes. The outer ends of the two scavenging conduits 23 are manifolded together and to an evacuator, for scavenging.

A disc assembly 49, having an outer diameter such as to fit very closely within port ring 24, is mounted for rotation at a high angular velocity (e.g., 9600 r.p.m.) within port ring 24. If the disc is twelve inches in diameter, this means that the lineal speed at the outer edge of the disc is about 30,000 feet per minute. This disc assembly is mounted for rotation about a horizontal axis which coincides with the longitudinal axis of port ring 24, so that the outer cylindrical surface of the disc rotates just inside the inner cylindrical surface of the stationary port ring. Assuming a clockwise direction of rotation of the disc in FIG. 2, a point on the outer surface of the disc (such as one end of a shock tube carried by the disc) would rotate (during 360° of disc rotation) past the following port ring elements in sequence, starting from a horizontal position: left-hand nozzle 28, recess 32′, recess 35′, recess 38′, groove 41′, groove 46, right-hand nozzle 28, recess 32, recess 35, recess 38, groove 41, and groove 43.

Figure 3:
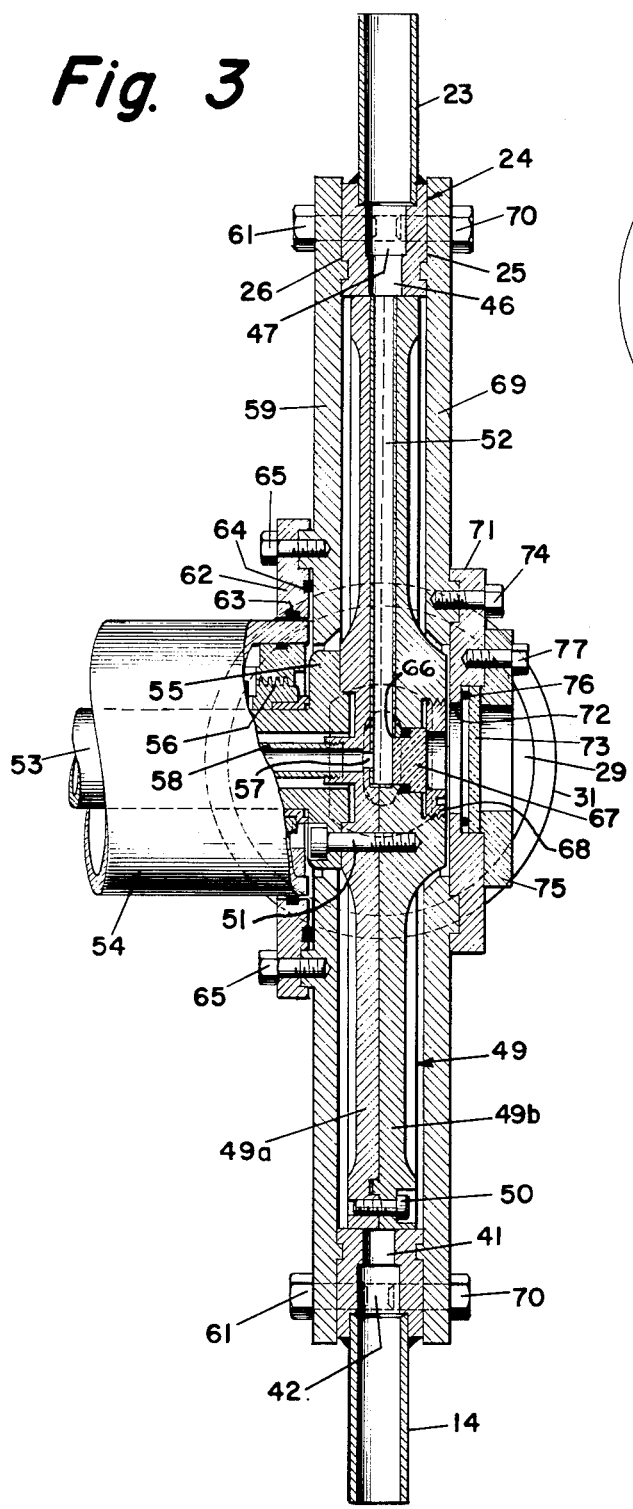
FIG. 3 is an essentially vertical section, taken on line 3—3 of FIG. 2.

The disc assembly 49 comprises two mating disc portions 49a and 49b, both of circular outer configuration, which are sandwiched together and held in assembled relation by means of an outer series of bolts 50 arranged in a circle, and an inner series of bolts 51 arranged in a circle of smaller diameter (see FIG. 3). Bolts 50 pass through disc portion 49b and thread into tapped holes in disc portion 49a. A squared groove is cut into each of the disc portions 49a and 49b, along a diameter thereof, such that when such two portions are assembled together, a channel of square cross-section is formed by the two squared grooves. Prior to assembly of the two disc portions, a tube 52 of square cross-section (¼-inch by ¼-inch, for example) is fitted closely into this channel, to provide a straight elongated shock tube (close to twelve inches in length) which extends diametrically of the disc assembly. Tube 52 is open at both ends, and the ends of the tube terminate closely adjacent the inner cylindrical surface of the port ring 24, as shown in FIG. 2. The tube 52 extends transversely to the horizontal axis of rotation of the disc assembly, and as the disc rotates in essentially a vertical plane, the ends of the tube 52 come into communication with the various nozzles, recesses, and grooves associated with port ring 24 in the order previously set forth, considering one end of the tube 52 at a time. In FIG. 2, tube 52 is illustrated with its center line in a vertical position, wherein one end of this tube is in communication with groove 46, and the opposite end of this tube is in communication with groove 43. It will be realized, from what has been said previously, that the center lines of the various recesses and grooves in port ring 24 all lie in a common vertical plane.

For a more detailed description of the construction of disc assembly 49, reference may be had to the co-pending application, Serial No. 329,729, filed December 11, 1963, which ripened on February 15, 1966 into Patent No. 3,235,341.

A hollow horizontally-extending shaft 53 (see FIG. 3) is mounted for rotation within a fixed housing 54. Housing 54, which may be cylindrical with its axis extending horizontally, provides a support for the entire wave engine, and is rigidly secured to a suitable bracket or mount (not shown) which rests on the floor or other supporting surface. Shaft 53 is arranged to be rotated at a high rate of speed (e.g., 9600 r.p.m.) by a motor (not shown), which is coupled by means of a suitable mechanical coupling (also not shown) to the end of shaft 53 opposite to disc 49. The heads of bolts 51 engage an integral collar 55 on one end of shaft 53, and these bolts pass through disc portion 49a and thread into tapped holes in disc portion 49b. Thus, bolts 51, in addition to securing the disc portions 49a and 49b together, couple disc assembly 49 to shaft 53, thereby to cause rotation of disc 49 at the same high rate of speed as shaft 53.

Although not illustrated in FIG. 3, it is to be understood that a journal bearing is provided within housing 54, near the disc end of this housing, for journalling shaft 53 within this housing. Also, a combined journal and thrust bearing is provided for shaft 53 within housing 54, at the end of this housing adjacent the shaft driving means.

The shock tube 52, being rigidly mounted in disc assembly 49, rotates at the same high rate of speed as the disc and shaft 53. It may be seen that the disc 49 rotates essentially in a vertical plane, about the horizontal axis provided by shaft 53. The shock tube 52, of course, rotates in this same plane. A labyrinth seal (a portion of which is illustrated at 56) is used around shaft 53. In addition, other seals (not shown) may be utilized, to enhance the overall sealing around shaft 53.

For pressure measurement purposes, an aperture 57 may be provided in the rear wall of tube 52, centrally of the length thereof, and in this aperture a pressure transducer (not shown) may be inserted, to measure the pressure at the center of the shock tube as the latter rotates. The transducer is so constructed that it in effect fills in the aperture 57, and forms a continuation of the tube wall, for gas flow in the shock tube. The pressure transducer leads may be taken off through a conduit 58 which extends through the bore of hollow shaft 53 and one end of which threads into a threaded fitting provided at the center of the rear face of disc assembly 49. Conduit 58, and the pressure transducer also, rotate with disc assembly 49.

A rear cover plate 59, which is more or less disc-shaped, is secured to the rear face 26 of port ring 24. Cover plate 59 is attached in any suitable manner to housing 54, in order to provide proper support for the principal stationary parts of the wave engine (such as the port ring, etc.). By way of example, three two-piece lugs may be provided, one piece of each lug being rigidly secured to housing 54 and the other piece of each lug being rigidly secured to plate 59. Each pair (two "pieces") of the matched lugs is held together by a radial pin.

For securing cover plate 59 to port ring 24, a circular array of longitudinally-extending tapped holes 60 is provided in ring 24. Bolts 61 pass through plate 59 and thread into the respective holes 60, to secure rear cover plate 59 to port ring 24. Cover plate 59 has a substantially circular opening at its center, of a diameter such as to clear the rotating collar 55. It is pointed out that the axial dimension of the thinner, web-like, radially-outer portion of disc assembly 49 is appreciably less than that of port ring 24, so that there is clearance space (for rotation of disc 49) between the front or inner face of cover plate 59 and the rear face of disc 49. Also, sufficient clearance is of course provided between the radially outer edge of disc 49 and the radially inner edge of ring 24.

A seal ring 62 is used to seal the space between the inner end of housing 54 and the rear face of cover plate 59. Ring 62 carries in its inner cylindrical surface a gasket 63 (for example, an O-ring) which provides a seal against the outer cylindrical surface of housing 54, and carries in its front circular face a gasket 64 (for example, an O-ring) which provides a seal against the rear face of cover plate 59. Seal ring 62 is held in position by a plurality of bolts 65 which pass therethrough and thread into tapped holes provided in cover plate 59.

To enable visual inspection of the shock tube 52 during operation of the engine, an aperture 66 is provided in the front wall of tube 52, centrally of the length thereof, and in this aperture there is inserted a stepped inner quartz window 67 which is held in position by a threaded bushing 68, this bushing being threaded into a tapped hole provided near the center of disc portion 49b. The inner step of the window 67 in effect fills in the aperture 66, and forms a continuation of the tube wall, for gas flow in the shock tube. Elements 67 and 68 are carried by the disc assembly 49, and rotate therewith.

A front cover plate 69, which is more or less disc-shaped, is secured to the front face 25 of port ring 24. The tapped holes 60 extend entirely through the port ring body. Bolts 70 pass through plate 69 and thread into the respective holes 60, to secure front cover plate 69 to port ring 24. Plate 69 has a substantially circular opening at its center, of a diameter such as to clear the central hub of rotating disc assembly 49. Since (as previously stated) the axial dimension of the thinner, web-like, radially-outer portion of disc assembly 49 is less than that of port ring 24, and since the disc is positioned centrally (in the axial direction) of the port ring, there is clearance space (for rotation of disc 49) between the rear or inner face of cover plate 69 and the front face of disc 49.

A disc-shaped window holder 71 has therein a counter-bored central aperture 72 in the counterbore of which is seated an outer quartz window 73. Window holder 71 is secured to the central area of the outer or front face of the stationary cover plate 69 by means of bolts 74 which pass through holder 71 and thread into tapped holes provided in cover plate 69. The center line of window 73 is aligned with the center line of window 67, so that the operator can look from the front of the wave engine through windows 73 and 67 into the interior of tube 52.

A clamp ring 75 bears against the clamps outer window 73 in position against an O-ring seal 76, which latter also engages the window holder 71. Clamp ring 75 is secured to window holder 71 by means of bolts 77 which pass through the ring and thread into tapped holes provided in the holder.

Refer again to FIG. 2. A pair of diametrically opposite vent pipes 78 are sealed through the front cover plate 69, these pipes being centered on a horizontal diameter and being located near the outer periphery of the disc assembly 49. Pipes 78 are welded each to a respective square mounting plate 79 which is in turn secured by bolts 80 to the front cover plate 69. The inner ends of the pipes 78 communicate with the space between the disc 49 and the front cover plate 69, while the outer ends of these pipes vent to the atmosphere. Pipes 78 thus serve to vent the front space inside the housing, which is formed by the cover plates, to the atmosphere.

A pair of vent pipes, similar to pipes 78 but not shown in the drawings, are sealed through the rear cover plate 59, to vent the rear space inside the housing to the atmosphere.

As previously described, the straight open-ended shock tube 52 rotates (in a clockwise direction in FIG. 2) at high angular velocity, essentially in the plane of the paper, about an axis (the center line of shaft 53) perpendicular to the plane of the paper, the disc rotating within the port ring 24. The ends of the tube 52 thus rotate past the various nozzles, pockets, and grooves associated with the port ring 24, as previously described. As the open ends of the tube 52 rotate past the various nozzles, grooves, and pockets associated with the port ring 24, these ends of course come into communication with such nozzles, grooves, and pockets, in the definite order of succession which was described previously. The action occurring during one-half revolution (180° of rotation) of the disc 49 and the shock tube 52 will now be described in detail. As previously stated, disc 49 is assumed to be rotating in the clockwise direction in FIG. 2.

As one end of the tube 52 comes into communication with groove 43 (by rotating past the counterclockwise end of this groove), process gas begins to flow into this end of the tube, since said groove is coupled to the charge or reactant feed conduits 1. This flow continues to take place throughout the travel of this end of the tube past groove 43. This flow comes about because of the following pressure differential: The product withdrawal (from the previous cycle of operation) has taken place at about 0.5 atmosphere (as previously stated), while the immediately-following charge reintroduction is at about one atmosphere (as also previously stated).

At the same time that the aforesaid one end of tube 52 comes into communication with groove 43, the other end of this tube comes into communication with groove 46 (which is diametrically opposite groove 43), by rotating past the counterclockwise end of groove 46. Since groove 46 is coupled to the scavenging or purging conduits 23, the new charge coming in via conduits 1 pushes out the materials remaining in the tube 52 after a previous cycle of operation of the wave engine, to scavenge the tube. The scavenging of the tube continues throughout the travel of said other end of the tube past groove 46. In this connection, it is pointed out that the grooves 43 and 46 have exactly the same angular length or extent, and are diametrically opposite each other; the travel of said one end of tube 52 past groove 43 thus coincides with the travel of said other end of the tube past groove 46. It may be noted that, at the moment or instant (during the rotation of disc 49) illustrated in FIG. 2, one end of tube 52 is in communication with groove 43, and the other end of this tube is in communication with groove 46.

Following the travel of said one end of shock tube 52 (which may be thought of as the lower end of the tube in FIG. 2) past the clockwise end of groove 43, this end of the tube comes into sudden communication with the interior of the left-hand nozzle 28; at this same instant, said other end of the tube comes into sudden communication with the interior of the right-hand nozzle 28. Both ends of the shock tube 52 are thereby suddenly (and simultaneously) connected to the reservoir of high pressure driving gas (hydrogen), by way of the lines 3 (FIG. 1) which are coupled to the outer ends of these nozzles and also to the hydrogen reservoir 4. Two shock waves are thereby created, as previously described. The process gas (reactant material) in the tube 52 is thereby compressed and brought very rapidly to the reaction temperature. The adiabatic compression process is completed by the time the ends of the tube have completed their travel past the nozzles 28.

Said one end of the tube thereafter comes into communication with pocket 32', and simultaneously said other end of the tube comes into communication with pocket 32. Pocket 32' communicates with the left-hand line 5, and pocket 32 with the right-hand line 5. Expansion waves are set up, as previously described. The first expansion process is completed by the time the ends of the tube have completed their travel past the clockwise ends of the respective recesses or pockets 32' and 32.

Said one end of the tube thereafter comes into communication with pocket 35', and simultaneously said other end of the tube comes into communication with pocket 35. Pocket 35' communicates with the left-hand line 6, and pocket 35 with the right-hand line 6. Expansion waves are again set up, to begin a second expansion process, which latter is completed by the time the ends of the shock tube 52 have completed their travel past the clockwise ends of the respective recesses or pockets 35' and 35.

Said one end of the shock tube thereafter comes into communication with pocket 38', and simultaneously said other end of the tube comes into communication with pocket 38. Pocket 38' communicates with the left-hand line 7, and pocket 38 with the right-hand line 7. Expansion waves are again set up, to begin a third expansion process, which latter is completed by the time the ends of the tube 52 have completed their travel past the clockwise ends of the respective recesses or pockets 38' and 38. At the end of this third expansion process, all the motive or driving-gas hydrogen has left the tube.

Said one end of the tube 52 thereafter comes into communication with groove 41', and simultaneously said other end of the tube comes into communication with groove 41. Groove 41' communicates with one of the "product out" lines 14, and groove 41 communicates with the other "product out" line 14. Discharging of product gases now takes place from said one end of the shock tube, via groove 41', and from said other end of the shock tube, via groove 41. This discharging continues until the time at which said one end of the tube passes the clockwise end of groove 41' and said other end of the tube passes the clockwise end of groove 41.

An essential requirement, for successful operation of the wave engine of this invention, will now be set forth. This requirement must be kept in mind when designing and operating the engine. The time elapsed, from the moment a compression or expansion wave enters an end of the shock tube 52 until it arrives at the same tube end as a reflected wave, must coincide with the time required for the tube end to move over the full arc of the respective groove or pocket. As previously described, compression or expansion waves enter the ends of the tube when the same comes into communication with (the motive hydrogen) nozzles 28, with the hydrogen withdrawal lines 5, 6, and 7, and with the product withdrawal lines 14. Thus, the above requirement is an important factor in determining the arcuate lengths (in FIG. 2) of the nozzles 28, of the pockets 32, 32', 35, 35', 38, and 38', and of the grooves 41 and 41'.

After the instant at which said one end of tube 52 passes the clockwise end of groove 41' and said other end of the tube passes the clockwise end of groove 41, said one end of the tube comes into communication with groove 46, and simultaneously said other end of the tube comes into communication with groove 43. Now, the tube has rotated through 180° and the action previously described begins to repeat (thereby to begin a new cycle of operation of the wave engine). The same action as previously described then repeats, except that now the ends of the tube 52 are reversed, the "one" end now becoming the "other" end and the "other" end now becoming the "one" end. It may therefore be seen that the tube 52 is double-ended (both ends thereof being open), and that there are two complete cycles of operation of the wave engine per complete (360°) revolution of the disc 49.

The invention claimed is:

1. In a wave engine, a substantially solid cylindrical rotor mounted for rotation about its central longitudinal axis, the diameter of said rotor being large compared to its axial length, said rotor having therein a single straight open-ended channel which extends transversely to said axis and diametrically of said cylinder and whose ends open into the cylindrical surface of said rotor; a stationary port ring closely surrounding the cylindrical surface of said rotor, and means providing a pair of diametrically-opposite driving gas inlets in said ring, said inlets being adapted to come into communication with said channel as the latter is rotated; said ring having therein, beyond the respective inlets in the direction of rotation of said rotor, at least one pair of diametrically-opposite driving gas outlets which are adapted to come into communication with said channel as the latter is rotated; said ring also having therein, beyond the respective outlets in the direction of rotation of said rotor, a pair of diametrically-opposite product gas outlets which are adapted to come into communication with said channel as the latter is rotated; said ring further having therein, beyond one of said product gas outlets in the direction of rotation of said rotor, a charge gas inlet which is adapted to come into communication with said channel as the latter is rotated.

2. A wave engine as recited in claim 1, wherein said ring has therein a plurality of pairs of diametrically-opposite driving gas outlets which form two diametrically-opposite groups, all of the outlets of each respective group being located between a respective driving gas inlet and the corresponding product gas outlet.

3. A wave engine according to claim 1, wherein each of said product gas outlets includes a respective arcuately-elongated groove in the inner cylindrical surface of said ring.

4. A wave engine according to claim 1, wherein said charge gas inlet includes an arcuately-elongated groove in the inner cylindrical surface of said ring.

5. A wave engine according to claim 1, wherein said charge gas inlet, and also each of said product gas outlets, includes a respective arcuately-elongated groove in the inner cylindrical surface of said ring.

6. A wave engine as defined in claim 5, wherein the arcuate length of the product gas outlet grooves is less than that of the charge gas inlet groove.

7. A wave engine in accordance with claim 1, wherein said disc-like rotor is mounted for rotation in a vertical plane, about a substantially horizontal axis.

8. In a wave engine, a substantially solid cylindrical rotor mounted for rotation about its central longitudinal axis, the diameter of said rotor being large compared to its axial length, said rotor having therein a single straight open-ended channel which extends transversely to said axis and diametrically of said cylinder and whose ends open into the cylindrical surface of said rotor; a stationary port ring closely surrounding the cylindrical surface of said rotor, means providing a pair of diametrically-opposite driving gas inlets in said ring, said inlets being adapted to come into communication with said channel as the latter is rotated, means providing in said ring at least one pair of diametrically-opposite driving gas outlets which are adapted to come into communication with said channel as the latter is rotated, said outlets being located beyond the respective inlets in the direction of rotation of said rotor, means associated with said ring for supplying charge gas to said channel, and means associated with said ring for abstracting product gas from said channel.

9. A wave engine in accordance with claim 8, wherein the last-mentioned means comprises a product gas outlet in said ring, said product gas outlet being adapted to come into communication with an end of said channel as the latter is rotated and being located beyond an adjacent driving gas outlet, in the direction of rotation of said rotor.

10. A wave engine in accordance with claim 8, wherein said disc-like rotor is mounted for rotation in a vertical plane, about a substantially horizontal axis.

References Cited by the Examiner

UNITED STATES PATENTS 2,902,337   9/1959   Glick et al. _____ 23—284 X
3,254,960   6/1966   Hansel _____ 23—252

MORRIS O. WOLK, *Primary Examiner.*

JAMES H. TAYMAN, JR., *Examiner.*